June 14, 1949.    N. P. DARASH    2,473,138
MACHINE TOOL
Original Filed Nov. 11, 1943    2 Sheets-Sheet 1
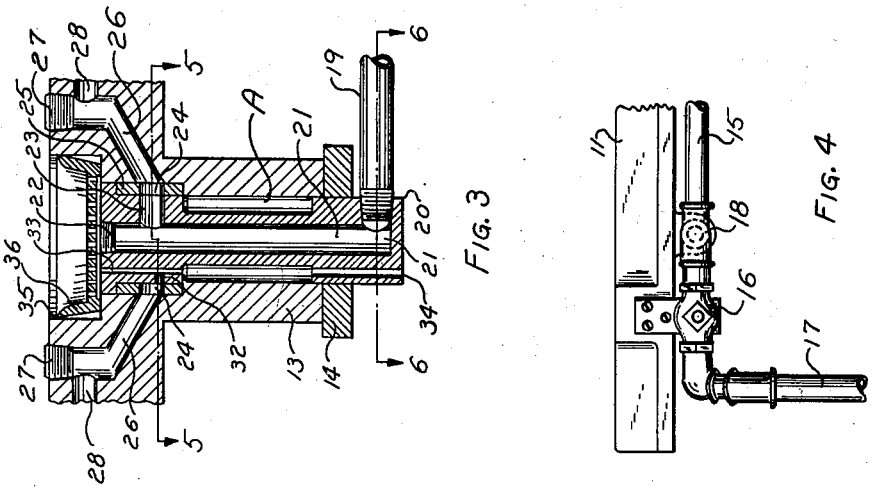
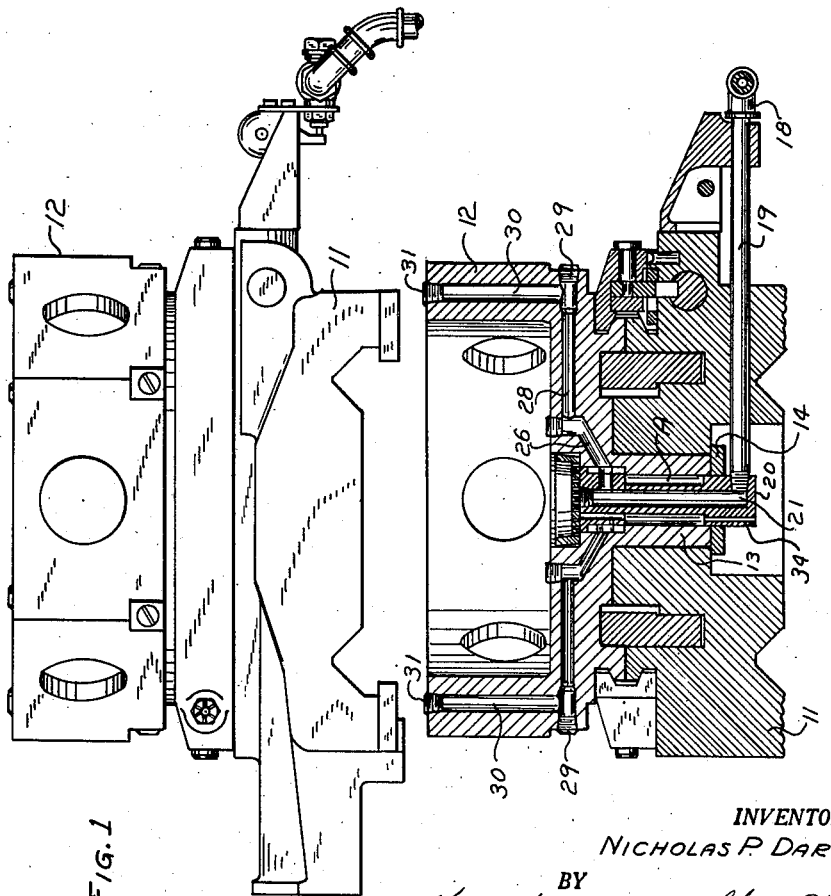
INVENTOR.
NICHOLAS P. DARASH
BY
Kwis Hudson Boughton & Williams
ATTORNEYS

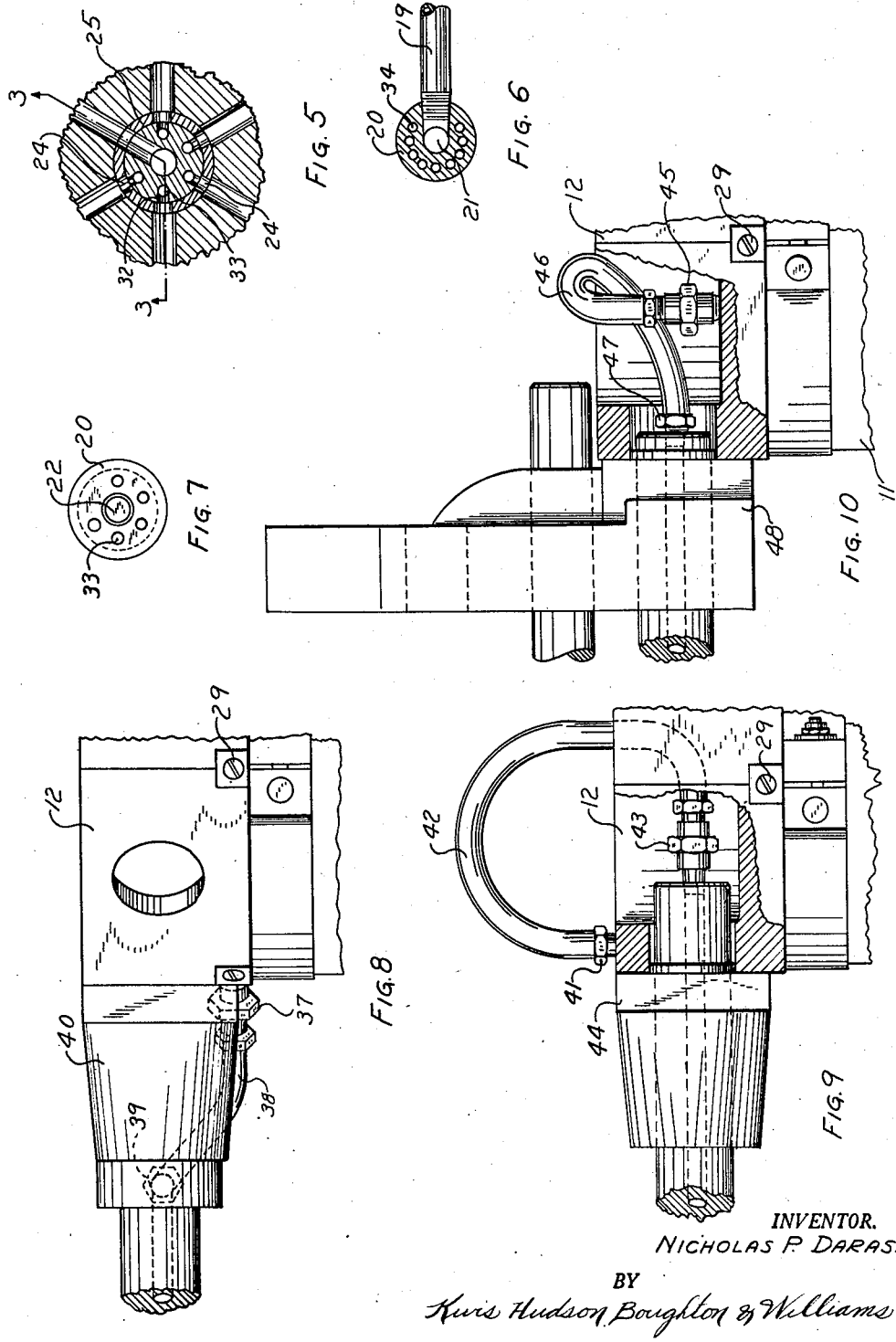

Patented June 14, 1949

2,473,138

UNITED STATES PATENT OFFICE 2,473,138

MACHINE TOOL

Nicholas P. Darash, Cleveland, Ohio, assignor to The Warner & Swasey Company, Cleveland, Ohio, a corporation of Ohio Original application November 11, 1943, Serial No. 509,841. Divided and this application October 21, 1944, Serial No. 559,738

8 Claims. (Cl. 29—48)

This invention relates to a machine tool and more particularly to means for supplying coolant to the tools carried by an indexible member of a machine tool. Although the mechanism may be advantageously employed in various types of machine tools for different indexible members thereof it will be shown and described herein by way of illustration as applied to the turret of a turret lathe.

This application is a division of my copending application Serial No. 509,841, filed November 11, 1943, and now Patent No. 2,461,631, granted February 15, 1949.

An object of the invention is to provide improved and novel means for supplying coolant to the tools carried by the indexible member of a machine tool.

Another object of the invention is to provide means for supplying coolant to the tools carried by the indexible member of a machine tool and which means is controlled by the indexing of said member.

A further object is to provide means for supplying coolant to the cutting tool carried by an indexible member of a machine tool and which cutting tool is currently in position to perform machining operations on the work.

A further object is to provide means for supplying coolant to the tools carried by the indexible member of a machine tool and wherein the coolant is supplied only to the cutting tool which is in work performing position, while the coolant is drained away from the other and inactive cutting tools carried by the indexible member.

Another object is to provide means for supplying coolant to various types and kinds of tools and tool holders which may be mounted on the different faces of an indexible member of a machine tool and in such manner as is efficient, accessible and convenient and wherein the coolant connections to the tool or tool holder on the respective faces will not interfere with the connections to those on the other faces.

Further and additional objects and advantages not hereinbefore referred to will be pointed out in the description which is to follow.

Referring to the accompanying drawings,

Fig. 1 is a detached end elevational view of the turret slide and turret of a turret lathe looking from the end of the lathe opposite to the headstock and with the bed and ways which support the turret slide omitted.

Fig. 2 is a sectional view through the turret and turret slide.

Fig. 3 is a detached fragmentary irregular sectional view on a larger scale of a portion of the turret shown in Figs. 1 and 2 and is taken substantially on line 3—3 of Fig. 5, looking in the direction of the arrows.

Fig. 4 is a detached fragmentary elevational view taken looking from the right hand side of Fig. 1.

Fig. 5 is a fragmentary sectional view taken substantially on line 5—5 of Fig. 3, looking in the direction of the arrows.

Fig. 6 is a sectional view taken substantially on line 6—6 of Fig. 3, looking in the direction of the arrows.

Fig. 7 is a detached top plan view of a portion of Fig. 3.

Fig. 8 is a fragmentary front elevational view of the turret and shows a tool holder attached to the front face of the turret and a coolant connection between said tool holder and the lower part of the turret adjacent the rear end of the front face.

Fig. 9 is a view similar to Fig. 9 but partly in section and shows the coolant connection extending from the top of the turret at the rear of the front face to the tool holder, and Fig. 10 is a view similar to Fig. 9 but shows the coolant connection located internally of the turret and connected to the passage which extends to the rear part of the front face of the turret and to the tool holder mounted on said front face.

As will be well understood, the turret lathe, only portions of which are shown in the drawings, includes a bed having at one end a headstock which supports the work spindle. The bed (not shown) is provided with the usual parallel ways on which the turret slide 11 moves toward and away from the work spindle. The turret slide 11 is provided in this instance with a hexagonal indexible turret 12. As will be understood by those skilled in the art, the turret lathe may be provided intermediate the turret slide and the work spindle with a cross slide carriage movable on the ways of the bed and provided with a cross slide having a square turret.

Although the invention may be applied to different types of turrets or indexible members, the hexagonal turret 12, shown herein for purposes of illustration, is provided with a centrally located downwardly extending hollow post 13. The turret 12 and the post 13 are held against axial movement in one direction relative to the bearing opening in the turret slide 11 and in which opening the post is located, by means of a disk 14 secured to the lower end of the post 13 in any suitable manner. It will be noted that the underside of the turret 12 bears against the upper side of the slide 11 and thus the turret and post are held against axial movement in the other direction relative to the bearing opening. It will thus be seen that the turret 12 is freely rotatable on the slide 11. The turret 12 is clamped in indexed position by a clamping ring. The turret may be unclamped, unlocked, indexed, located, locked and clamped by the mechanism for such purposes fully described in my said application Serial No. 509,841, of which this application is a division, or by any other suitable mechanisms for performing such functions. The means for supplying coolant to the cutting tools carried by the turret will now be described.

Referring to Fig. 4, a conduit 15 leads from a pump (not shown) preferably located in the base of the machine to one side of a control valve 16 with the other side of said valve connected to a conduit 17 leading to the sump. In advance of the valve 16 the conduit 15 is provided with a T-connection 18 to which is connected a pipe 19 that extends toward the front of the turret slide 11 and terminates adjacent the axis of the turret. The valve 16 may be manually operated independently of any other mechanism of the machine or it may be operated automatically by the movement of the control lever for the turret indexing, locating, locking and clamping mechanism as described in my said copending application Serial No. 509,841.

The forward end of the pipe 19 is connected to a stationary coolant control member 20 which extends vertically and centrally within the post 13 of the turret. The member 20 is provided with a centrally disposed bore 21, the upper end of which is closed by a plug 22 while the lower end of said bore communicates with the pipe 19.

Referring to Fig. 2, it will be noted that the sectional view of the turret is taken along line 3—3 of Fig. 5, while the sectional view of the turret slide is taken along a straight line passing diametrically through the turret. The member 20 adjacent its upper end is provided with a laterally extending passage 23 that communicates selectively with one or another of six equally spaced openings 24 formed in a ring 25 fixed in the turret. The turret 12 is provided with six equally spaced outwardly and upwardly extending passages 26, the upper ends of which are threaded to receive either plugs 27 or the threaded ends of a coupling member later to be referred to. Each of the passages 26 communicates with a radially extending passage 28 that has its outer end threaded so as to receive a plug 29 or a coupling fitting later to be referred to. Each of the radially extending passages 29 communicates adjacent its outer end with the lower end of a vertically extending passage 30, the upper end of which is threaded and may be closed by a plug 31 or may receive a coupling fitting later to be referred to. Each passage 26 communicates with an opening 24 in the ring 25 and as the turret indexes to its different indexed positions the passage 23 in the member 20 is successively brought into communication with one of the openings 24 in the ring 25 and one of the passages 26 in the turret, it being remembered that the member 20 is stationary at all times. Consequently it will be seen that the passages 26, 28 and 30 and the opening 24 in the ring 25 which are adjacent the rear corner of the front face of the turret, i. e., that one facing the spindle, are in communication with the bore 21 in the member 20, and consequently receive the coolant from the pump when the valve 16 is adjusted so that coolant is not flowing to the sump through the valve and the conduit 17. The remaining passages 26 and openings 24 are in communication through small drainage openings 32 with circularly spaced vertically extending passages 33 formed in the upper part of the stationary member 20 and which passages communicate at their lower ends with the annular chamber formed by said member 20 and the post 13 of the turret intermediate the ends of the member 20, as clearly shown in Figs. 2 and 3 and as indicated by the reference character A. The lower end of the member 20 is provided with a plurality of circularly spaced drainage passages 34 which extend through said lower end of the member and allow any coolant collected in the annular chamber A to flow outwardly thereof and return to the sump.

The turret 12 is provided with a centrally located recess 35 above the post 13 and a strainer member 36 is arranged in this recess and in its bottom wall is provided with a plurality of openings, wherefore coolant can pass from the strainer member and into the passages 33 of the stationary member 20 and thence return to the sump while chips are excluded from said passages.

In Fig. 8 the plug 29 has been removed from the end of the passage 28 which is adjacent the lower rear corner of the front face of the turret and a coupling fitting 37 screwed into the threaded end of said passage 28. This coupling fitting is connected to one end of a hose 38, the opposite end of which hose is connected to a coupling fitting 39 which communicates with an opening in the tool holding member 40, wherefore coolant is free to flow from the passage 28 through the hose 38 and to the tool carried by the front face of the turret.

In Fig. 9 the plug 31 at the upper rear corner of the front face of the turret has been removed and a coupling fitting 41 screwed into the upper end of the passage 30. This coupling fitting is connected to one end of a hose 42, the opposite end of which hose is connected to a coupling fitting 43, in turn connected to the end of the tool holding member 44 within the turret, wherefore coolant can flow from the passage 30, through the hose 42 to the tool carried by the member 44.

In Fig. 10 the plug 27 at the upper end of the passage 26 which extends toward the rear corner of the front face of the turret and which plug is located within the turret is removed and a coupling fitting 45 is connected to one end of a hose 46 located within the turret and having its opposite end connected to a coupling fitting 47 which is connected within the turret to the tool holding member 48, wherefore coolant will flow to the cutting tool at the front face of the turret from the passage 26 through the hose 46.

From the foregoing it will be noted that various types and kinds of tool holders can be mounted on the faces of the turret and the coolant supplied thereto in the most efficient, accessible and convenient way by means of hoses connected either to the upper end of the passage 30, the outer end of the passage 28 or the upper end of the passage 26, as the case may be. Consequently, the couplings and hoses can be positioned where they will not interfere with the tool holders on the other turret faces.

When the valve 16 is adjusted to close communication between the valve and the pipe 17 to the sump the coolant will flow through the pipes 15 and 19 to the tool holder that is carried by the front face of the turret, but no coolant will flow to the tool holders carried by the other faces of the turret and which are in inactive position. This is due to the fact that the passage 23 only communicates in each indexed position of the turret with the passages 26, 28 and 30 that extend to the front or active face of the turret.

It will also be understood that in each indexed position of the turret any coolant which is in the passages that extend to the inactive faces of the turret is draining back into the sump through the openings 32, passages 33, the annular chamber A and the passages 34.

Preferably the valve 16 will be actuated prior to each indexing movement of the turret, so that the conduits 15 and 17 are in communication with each other and the coolant is flowing freely from the pump to the sump and is not flowing to the turret, while any coolant which may be in the passages leading to the tools or tool holders previously used is draining back to the sump. In this way the indexing movement of the turret will not cause any coolant to be thrown outwardly by centrifugal force.

Although a preferred embodiment of the invention has been illustrated and described herein it should be understood that the invention is susceptible of various modifications and adaptations within the scope of the appended claims.

Having thus described my invention, I claim:

1. In a machine tool, a support, an indexible member thereon and provided with a plurality of faces adapted to mount tool holders, passages in said member extending from centrally thereof to each of said faces, fixed means located centrally of said member and provided with a passage and a port extending laterally from said passage and adapted to register successively with each one of said first named passages as said member progresses through its different indexed positions, said fixed means being provided with spaced passages and laterally extending drainage openings adapted to communicate with the other of said first named passages in each indexed position of the member whereby coolant can be introduced into said one passage of the member and drained from the remaining passages thereof.

2. In a machine tool, a support, an indexible member thereon provided with a plurality of faces adapted to mount tool holders and having a central hollow post depending from the underside of said member and rotatably mounted in said support, passages in said member communicating with the interior of said post and extending to each of said faces, means located within said post and provided with a passage and a port extending laterally from said passage and adapted to register successively with each one of said first named passages as said member progresses through its different indexed positions, said means also being provided with spaced passages and laterally extending drainage openings adapted to communicate with the other of said first named passages in each indexed position of the member whereby coolant can be introduced into said one passage of the member and drained from the remaining passages thereof.

3. In a machine tool having a support, an indexible member thereon and provided with a plurality of faces adapted to mount tool holders, said member being provided adjacent each face thereof with passages terminating at their outer ends at different locations with respect to the respective faces and with said outer ends of said passages formed to receive a closure plug or a hose fitting as the case may be whereby a hose can be connected selectively to any one of said passages and to a tool holder mounted on the respective face of said member, and means for connecting said passages with a source of coolant supply.

4. In a machine tool having a support, an indexible member thereon and provided with a central recess and having its periphery formed with a plurality of flat faces, groups of passages in said member with the groups corresponding in number to the number of faces of said member and with each group of said passages including a passage terminating into said recess adjacent the respective face of the member, a passage extending to the outer surface of said respective face adjacent the lower portion thereof and a passage extending to the upper edge of the respective face; the outer ends of said passages being threaded to receive closure plugs or hose fittings, and means for placing the passages of each group of passages in communication with a source of supply of coolant.

5. In a machine tool having a support, an indexible member thereon and provided with a plurality of faces adapted to mount tool holders, said member being provided with a plurality of coolant passages leading to said faces, and means operatively associated with said member and provided with passages corresponding in number to said first named passages and communicating with said first named passages in each indexed position of said member, one of said passages in said means being connected to a coolant supply source and acting to introduce coolant into one of the member passages in each indexed position of said member, the remaining passages in said means acting as drainage passages.

6. In a machine tool having a support, an indexible member thereon and provided with a central recess and having its periphery formed with a plurality of flat faces, circularly spaced passages in said member corresponding in number to the number of said faces, groups of passages in said member with the groups corresponding in number to the number of circularly spaced passages and with each group communicating with a circularly spaced passage and including a passage terminating in said recess adjacent the respective face of the member, a passage extending to the outer surface of said respective face adjacent the lower portion thereof and a passage extending to the upper edge of the respective face; the outer ends of said group passages being threaded to receive closure plugs or hose fittings, and means operatively associated with said member and automatically and successively placing each of said centrally spaced passages in communication with a source of supply of coolant as said member is indexed.

7. A machine tool as defined in claim 6 and wherein said means is provided with passages corresponding in number to said circularly spaced passages and adapted to communicate with said circularly spaced passages in each indexed position of said member, one of said passages in said means being in communication with a source of supply of coolant and the remaining passages in said means being drainage passages.

8. In a machine tool having a support, an indexible member thereon and provided with a plurality of faces adapted to mount tool holders, said member being provided with circularly spaced passages corresponding in number to said faces, said member also being provided adjacent each face thereof with passages terminating at their outer ends at different locations with respect to the respective faces and at their inner ends communicating with said first mentioned passages and with said outer ends of said second mentioned passages formed to receive a closure plug or a hose fitting as the case may be whereby a hose can be connected selectively to any one of said second named passages and to a tool holder mounted on the respective face of said member, and means cooperating with said member and provided with a coolant supply passage successively communicating with one of said first named passages in each indexed position of said member, said means also having drainage passages communicating with the remaining of said first named passages in each indexed position of said member.

NICHOLAS P. DARASH.

REFERENCES CITED

The following references are of record in the file of this patent:

UNITED STATES PATENTS

| Number | Name | Date |
| --- | --- | --- |
| 1,788,240 | Karcevsk | Jan. 6, 1931 |
| 1,806,603 | Armitage | May 26, 1931 |
| 2,255,739 | Curtis | Sept. 9, 1941 |
| 2,300,389 | Ruppel | Oct. 27, 1942 |
| 2,348,292 | Gross | May 9, 1944 |